Figure 1:
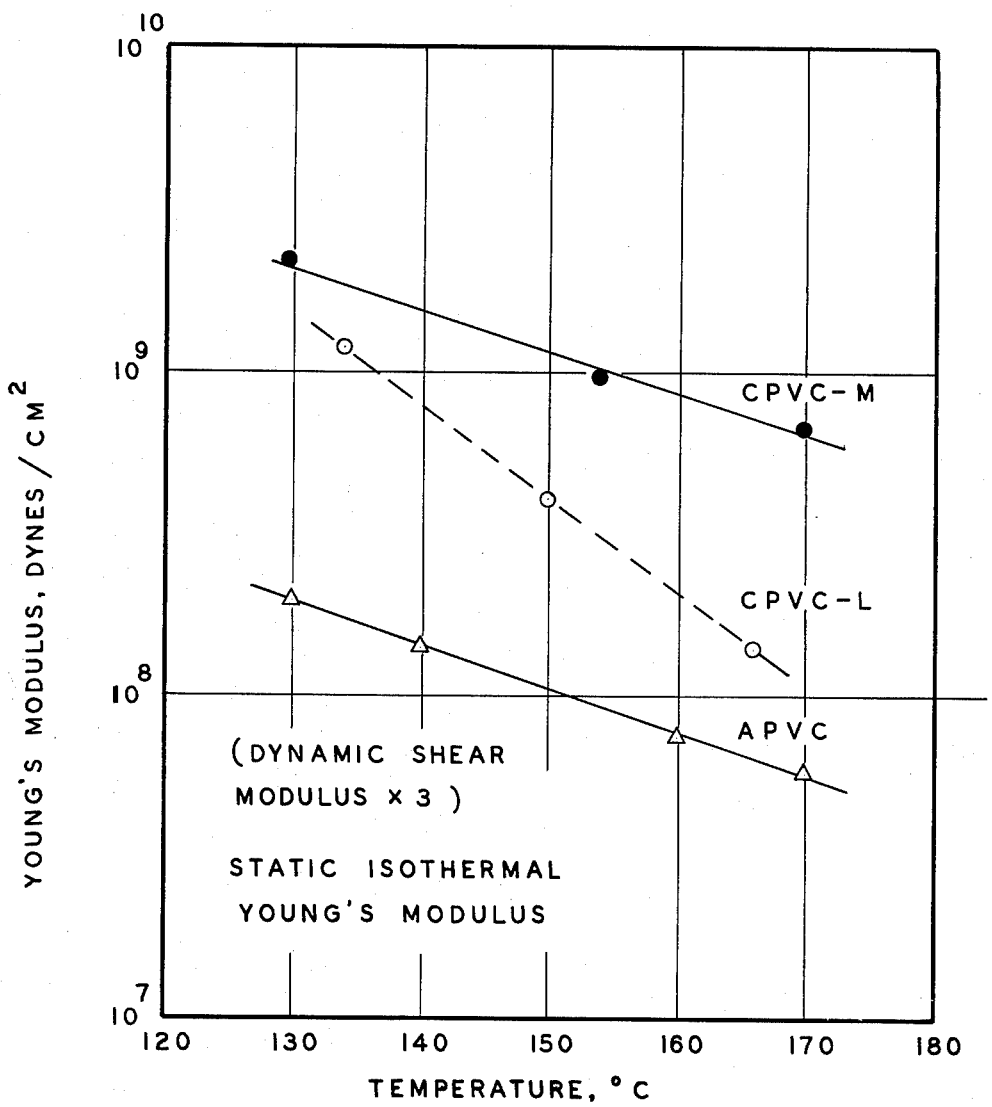

May 16, 1961  R. A. ISAKSEN ET AL  2,984,593
UNIAXIALLY ORIENTED POLYVINYL CHLORIDE
Filed Aug. 31, 1959  2 Sheets-Sheet 2

INVENTORS
ROBERT A. ISAKSEN
EDMUND H. MERZ
BY Cornelius H. Cleary
ATTORNEY 2,984,593
Patented May 16, 1961

2,984,593
UNIAXIALLY ORIENTED POLYVINYL CHLORIDE

Robert A. Isaksen, Chicopee Falls, and Edmund H. Merz, Wilbraham, Mass., assignors to Monsanto Chemical Company, St. Louis, Mo., a corporation of Delaware Filed Aug. 31, 1959, Ser. No. 837,242

7 Claims. (Cl. 154—46)

The present invention relates to polyvinyl chloride and more particularly to uniaxially stretch-oriented polyvinyl chloride members and products.

Considered broadly, polyvinyl chloride is an extremely attractive material. It is thermoplastic in nature and exhibits high resistance to water and solvent attack. Additionally, it is virtually nonflammable and has high electrical insulating properties. For these reasons, broad utility has been forecast for the same, and while much has been effected, there is at least one area in which very little success has been attained.

Fibers, filaments and the like used in textiles are subjected to stringent conditions during processing, for example, during the spinning, weaving, dyeing and finishing operations. In the first of these, the fibers or filaments must have sufficient tensile strengths otherwise breakdowns result to the extent that the operation becomes too costly for commercial practice. With regard to the dyeing and finishing operations, the fibers or fabrics made from the same, must be capable of being subjected to temepratures approaching the boiling point of water and even higher with the fibers remaining undistorted and/or resisting shrinkage.

In the past, while a satisfactory level of tensile strength could be developed in fibers made from polyvinyl chloride, nevertheless, the problem of resisting thermal deformation remained unsolved.

Accordingly, it is the principal object of the present invention to provide uniaxially oriented members such as fibers, filaments, films, foils, bands, tubes, etc. of polyvinyl chloride capable of withstanding shrinkage when subjected to temperatures on the order of 100° C. and higher.

Another object is to provide uniaxially oriented polyvinyl chloride members having improved tensile strengths of up to and greater than about 50,000 p.s.i.

Other objects will in part be obvious and will in part be disclosed hereinafter.

These and other objects of the present invention can be attained in a process for providing uniaxially stretched polyvinyl chloride members exhibiting tensile strengths of up to and greater than about 50,000 p.s.i. and which are essentially shrink-resistant when submerged in water having a temperature of about 100° C., which comprises the steps of subjecting crystallizable polyvinyl chloride members containing a finite quantity of up to 20% by weight of a solvent for said polyvinyl chloride and which members have been deposited from solution to (a) being stretched 500–700% of the original length at a rate of 10,000–30,000% per minute under a temperature of 100–125° C., and thereafter, (b) while maintaining said polyvinyl chloride members in said stretched condition, subjecting the same to a temperature of 150–180° C. for a finite period of up to 30 minutes.

The following examples are given in illustration of the invention. Where parts are mentioned, parts by weight are intended unless otherwise prescribed.

*Example I.*—A reactor constituting a 4-necked, 1.5 liter flask fitted with (a) stirrer, (b) reflux condenser and gas (nitrogen) inlet, (c) thermocouple and (d) a catalyst-dropping funnel, is placed in a methanol-Dry Ice bath. The reactor is purged with nitrogen for a period of one hour and is then cooled to about —40° C. Both the nitrogen atmosphere and the above temperature are maintained throughout the reaction period. Thereafter, 800 grams of vinyl chloride monomer, which has been distilled to remove water, phenol, etc. are charged into the reactor. This is followed by adding 20 grams of a 5.0% solution of tri-n-butyl borane in hexane over a period of about 5 minutes, and then followed by gradual addition of 1.5 grams of a 1% solution of hydrogen peroxide in methanol over a 4 hour reaction period.

At the end of the 4 hour reaction period, a 10% solution of hydroquinone in methanol is added in sufficient quantity to combine with the remaining free radicals of the borane catalyst, in order to cause the catalyst to become deactivated.

The reaction product is allowed to warm up to room temperature simultaneously with distilling off any unreacted vinyl chloride monomer. During distillation, methanol is added to maintain the polyvinyl chloride in a slurry form.

The polymer slurry is removed from the reaction vessel and filtered through cotton shirting. Following filtration, the polymer is extracted in a Soxhlet extractor (refluxing) with methanol to remove hydroquinone, and then dried in an air-circulating oven at a temperature of 55–60° C. for 12–16 hours. The polymer product is granular in nature and has a molecular weight of 75,000, as inferred from the intrinsic viscosity observed on a 1% starting solution of the same in cyclohexanone at 25° C. in an Ostwald-Fenske viscometer. The viscometer has a flow-time for cyclohexanone of 100 seconds or greater at 25° C. When the dried polymer product is analyzed by dynamic mechanical and X-ray diffraction methods, the presence of crystallizable polyvinyl chloride is discerned in an amount sufficient for successful operation of the present invention. Both the dynamic shear modulus and X-ray analyses procedures which can be practiced for this purpose will be described in detail later in the specification.

*Example II.*—To the reaction apparatus described in Example I, which has been purged, provided with a nitrogen atmosphere and a temperature of about —20° C., is charged a deaerated mixture of ethanol and water (35/65) followed by 800 grams of vinyl chloride, then 20 grams of a 5.0% solution of tri-n-butyl borane in hexane and finally 1.5 grams of a 1.0% solution of hydrogen peroxide in hexane. During the reaction period, of about 3 hours, the nitrogen atmosphere and the reaction temperature of about —20° C. are maintained.

With the completion of the reaction period, the tri-n-butyl borane catalyst is deactivated and the reaction product is allowed to warm up to room temperature. During the warm-up period, unreacted vinyl chloride is allowed to distill off. The resulting polymer slurry is then extracted and the polymer product dried in the manner previously described.

The polymer product is again granular in nature and has a molecular weight of 65,000, inferred as before. When the dried polymer is analyzed by the X-ray diffraction and dynamic mechanical methods, the presence of crystallizable isomers in an amount sufficient for successful operation of the present invention, is evidenced.

*Example III.*—Each of the polymer products of Examples I and II are separately placed in 50 times their weight of tetrahydrofuran being maintained at room temperature for a period of 12 hours. In each instance, a gelatinous fraction remains undissolved which can again be determined as being crystallizable polyvinyl chloride by X-ray diffraction and dynamic mechanical methods. This fraction represents about 65% by weight of the original granular product. The gelatinous fraction is separated, washed with methanol to extract tetrahydrofuran and then dried to produce a granular product.

A. *Cast films of solvent-containing crystallizable polyvinyl chloride.*—Samples of the granular crystallizable polyvinyl chloride above, are dissolved in cyclohexanone at 120° C. to provide 3% by weight solutions of the same. These solutions are poured onto sheets of glass and dried in a circulating air oven at 50–70° C. for 6 hours. The resulting cast films of crystallizable polyvinyl chloride are on the order of 2 mils in thickness and contain about 2% by weight of solvent i.e., cyclohexanone.

B. *Cast films of crystallizable polyvinyl chloride (solvent removed).*—The procedure of A above is again followed to provide cast films of crystallizable polyvinyl chloride about 2 mils in thickness. These films however, are air dried at 120° C. and 1.0 mm. Hg for a period of 10 hours, that is to constant weight, in order to insure removal of cyclohexanone solvent from the films.

C. *Molded films of crystallizable polyvinyl chloride.*—Portions of the granular crystallizable polyvinyl chloride above, are compression molded into films using a molding temperature of 180–200° C. and a molding pressure of 1000 p.s.i. Three minutes heat-up and two minutes compression cycles are used. The films are plunged into water having a temperature of 5–10° C. The molded films of crystallizable polyvinyl chloride are 10 mils thick.

*Example IV.*—A pressurized reactor which is provided with a mechanical agitator and while being maintained under a pressure of 100 p.s.i., is charged with 100 parts vinyl chloride monomer, .25 part lauroyl peroxide, 200 parts of water and .50 part of animal gelatin. The reaction mixture is heated to 50° C. and maintained under agitation for 18 hours. At the completion of the reaction period, unreacted monomer is vented off and the granular polymer is separated by centrifugation and dried. The granular product has a molecular weight of 70,000 as inferred from the intrinsic viscosity observed in a 1% starting solution of the same in cyclohexanone, at 25° C. in the Ostwald-Fenske viscometer. When analyzed by X-ray diffraction procedures, the crystallizable polyvinyl chloride isomeric form is noted to be essentially absent. To state it differently, the product is determined as being noncrystallizable or atactic in nature for present purposes.

Portions of this noncrystallizable product are compression molded into films using a molding temperature of 160–180° C. and a molding pressure of 1000 p.s.i. The molding cycle used is 3 minutes heat-up and 2 minutes compression. The films which result are taken out of the press mold and plunged into water having a temperature of 5–10° C. The compression molded films have thicknesses of 10 mils.

*Example V.*—Strip samples 0.5 inch wide x 2.5 inches long are taken from the films obtained from Example IIIA, B, C and Example IV. The edges of each are smoothed with fine crocus cloth.

Each of the samples is placed in a stretching frame allowing 1.4 inches between grips. The frame is drawn up into an air-circulating oven set at 115–120° C. and allowed to reach temperature equilibrium (about 4 minutes). The sample strips are then stretched 500–700% of the initial length in 1.0 second, or at a rate of 30,000% per minute. During stretching, the strip samples originating from Example IIIB and IIIC fracture.

Immediately upon completion of the stretching operation, the strip samples are removed, under tension, from the oven and quenched in air.

One-half of each of the strip samples is removed and retained as such while the remaining halves are clamped to polished steel plates and subjected to a temperature of 170° C., for 15 minutes in a circulating air oven (i.e., annealed).

PRODUCT TESTING

Tensile parameters including (a) elastic modulus (b) tensile strength and (c) ultimate elongation, all as defined in ASTM Test, designation: D882–56T, are determined on the various sample strips prepared above. In doing so, each specimen is clamped in the Instron tensile tester, being maintained at a constant temperature of 23° C. and constant relative humidity of 50%. The data derived directly from the Instron are in lbs. of load which can be converted to stress in p.s.i. of original cross-sectional area by dividing the load in pounds by the original cross-sectional area of the specimen expressed in square inches. The specimens are subjected in the tester to 10% per minute rate of elongation (strain) to fracture.

With respect to (d) yield stress and (e) yield elongation, these can be observed directly in or from the curves charted by the Instron during operation of the test procedure above. Yield elongation is the elongation in the strip sample at the time yield stress is reached.

The test results are shown in Table I which follows. Note that with respect to the strip samples originating from Examples IIIB and IIIC which fracture during stretching, a portion remaining after fracture is subjected to the various test procedures and the data obtained on the same.

*Table I*

UNANNEALED SAMPLES

| Example | IIIA | IIIB | IIIC | IV |
|---|---|---|---|---|
| Elastic Modulus (p.s.i.) | 600,000 | 280,000 | 220,000 | 400,000 |
| Tensile Strength (p.s.i.) | 40,000 | 9,600 | 8,700 | 8,900 |
| Ultimate Elongation (p.s.i.) percent | 25.0 | 10.0 | 7.6 | 19.8 |
| Yield Stress (p.s.i.) | 12,000 | 10,000 | 9,400 | 10,000 |
| Yield Elongation (p.s.i.) | 2.5 | 2.5 | 2.0 | 2.0 |

ANNEALED SAMPLES

| | IIIA | IIIB | IIIC | IV |
|---|---|---|---|---|
| Elastic Modulus (p.s.i.) | 830,000 | 420,000 | 400,000 | 250,000 |
| Tensile Strength (p.s.i.) | 51,000 | 7,600 | 5,800 | 8,000 |
| Ultimate Elongation (p.s.i.) percent | 17.0 | 4.6 | 3.8 | 5.0 |
| Yield Stress (p.s.i.) | 14,000 | 7,300 | 5,900 | 8,300 |
| Yield Elongation (p.s.i.) | 2.0 | 2.0 | 2.0 | 2.0 |

Consideration of the data contained in Table I above indicates that crystallizable polyvinyl chloride members processed in accordance with the dictates of the present invention, i.e., Example IIIA (Annealed Samples Table) evidence superior tensile properties over the remaining polyvinyl chloride members subjected to the described tests. Note for example, the superior elastic moduli and tensile strengths of the featured members when compared to all others tested, and particularly the advance attained as a result of the annealing step. In this regard, the unannealed counterpart, Example IIIA (Unannealed Samples Table), while having significantly superior tensile properties over crystallizable polyvinyl chloride members which have been originally cast into films, but which do not contain solvent, i.e., Examples IIIB (Unannealed Samples Table) and IIIB (Annealed Samples Table) and crystallizable polyvinyl chloride members which are taken from molded film, Examples IIIC (Unannealed Samples Table) and IIIC (Annealed Samples Table) still has considerably less significant tensile behavior than those of Example IIIA (Annealed Samples Table) which are annealed. Further as to the annealing step; note that during this step the non-crystallizable polyvinyl chloride members lose the improved tensile properties developed in them by stretch-orienting, and revert to the unoriented form, while the members coming within the purview of the present invention, Example IIIA (Annealed Samples Table) show a dramatic improvement in tensile behavior.

Additional strip samples of stretch-oriented, unannealed noncrystalline or atactic polyvinyl chloride (initially Example IV film) and strip samples of solvent-containing films of stretch-oriented, annealed crystallizable polyvinyl chloride (initially Example IIIA film) are tested for static isothermal Young's modulus at 130–170° C. In performing this test, two sets of strip samples are prepared from the crystallizable polyvinyl chloride. The first set is stretch-oriented to 400% of the original length. These samples are designated CPVC–L. The second set is stretch-oriented to 550% of the original length. These are designated CPVC–M. A third set of samples made from unannealed atactic polyvinyl chloride is also stretched 550% of the original length. These are designated as APVC. Each of the strip samples is marked with two fiducial points, one inch separating the points, along the longitudinal axes (stretch-oriented axes) of the samples. The samples are then hung with their longitudinal axes, stretched axes, in the vertical plane, in an oven provided with a Pyrex viewing window. The test is initiated by heating the samples for 4 minutes, or sufficient for them to reach temperature equilibrium, at distinct temperatures of 130° C., 150° C. and 170° C. During heat-up, the atactic-type samples lose their stretch-orientation. Upon reaching equilibrium, a 1000 p.s.i. load is hung from the bottom of each sample. The distances between the fiducial marks are read immediately before and after the loads are added, with a cathetometer. Static isothermal Young's modulus is then computed using the formula:

$$Y = \frac{S}{e}$$

where $Y$ = Young's modulus in dynes/cm.$^2$
$S$ = stress in dynes/cm.$^2$
$e$ = sample elongation in cm./cm.

The results derived are as follows:

Table II

| Sample | Temperature, °C. | Static Isothermal Young's Modulus (dynes/cm.$^2$) |
|---|---|---|
| APVC | 130 | $1.9 \times 10^8$ |
| CPVC–L | 130 | $1.7 \times 10^9$ |
| CPVC–M | 130 | $2.2 \times 10^9$ |
| APVC | 150 | $1.0 \times 10^8$ |
| CPVC–L | 150 | $4.2 \times 10^8$ |
| CPVC–M | 150 | $1.7 \times 10^9$ |
| APVC | 170 | $5.6 \times 10^7$ |
| CPVC–L | 170 | $1.1 \times 10^8$ |
| CPVC–M | 170 | $6.9 \times 10^8$ |

These data are graphically illustrated in the accompanying Fig. 1. As may be noted from the graph there, across the temperatures 130, 150 and 170° C., curve CPVC–M representing the static isothermal Young's modulus of the strip samples of stretch-oriented 550% remains an order of magnitude above curve APVC representing the static isothermal Young's modulus of those samples of atactic material stretched the same amounts. By comparison, curve CPVC–L, reflecting the static isothermal Young's modulus of the strip samples of crystallizable polyvinyl chloride, which are stretch-oriented only 400%, sharply approaches curve APVC at the higher temperature (170° C.). Thus, it can be determined that in order to obtain a significantly high order of thermal stability, it is necessary that solvent-containing, cast, crystallizable polyvinyl chloride members be stretch-oriented to greater than about 500% of their initial length.

That the polyvinyl chloride members produced in accordance with the dictates of the present invention have unusual resistance to thermal distortion which includes non-shrinking properties, is attested to by the results of the preceding series of tests, to wit: Static isothermal Young's modulus carried on at high temperatures. However, nonshrinking under more usual circumstances can be dramatically shown in a test which constitutes submerging samples of the various members in water heated to 100° C. for 60 minutes. This test is designed to simulate the condition confronted in textile operations, such as dyeing, finishing and the like, as well as laundering to which the members will undoubtedly be subjected after they have been provided in fabric form.

Strip samples, three inches in length are taken from the solvent-containing cast films of Example IIIA (crystallizable) and Example IV (atactic). These are stretch-oriented 500% of their initial length in 1.0 second or at a rate of 30,000% per minute at 115–120° C. For convenience, the strip samples taken from the atactic polyvinyl chloride will be designated APVC, while those taken directly after stretching, the crystallizable polyvinyl chloride will be designated CPVC-Unannealed. One half of the CPVC-Unannealed samples above are then annealed under tension for 15 minutes at 170° C. The annealed samples of crystallizable polyvinyl chloride will be designated CPVC-Annealed. The three sets of strip samples prepared above are submerged in a bath of boiling water, about 100° C. for a period of 60 minutes, then removed from the bath. After being allowed to dry to constant weight in air, the percent shrinkage, i.e., percent loss on original length, is determined. The results are as follows:

Table III

| Sample | Percent Shrinkage | Appearance |
|---|---|---|
| APVC | 38.0 | Coiled. |
| CPVC Unannealed | 5.0 | Wrinkled. |
| CPVC Annealed | <1.0 | Flat—Unchanged. |

Figure 2:
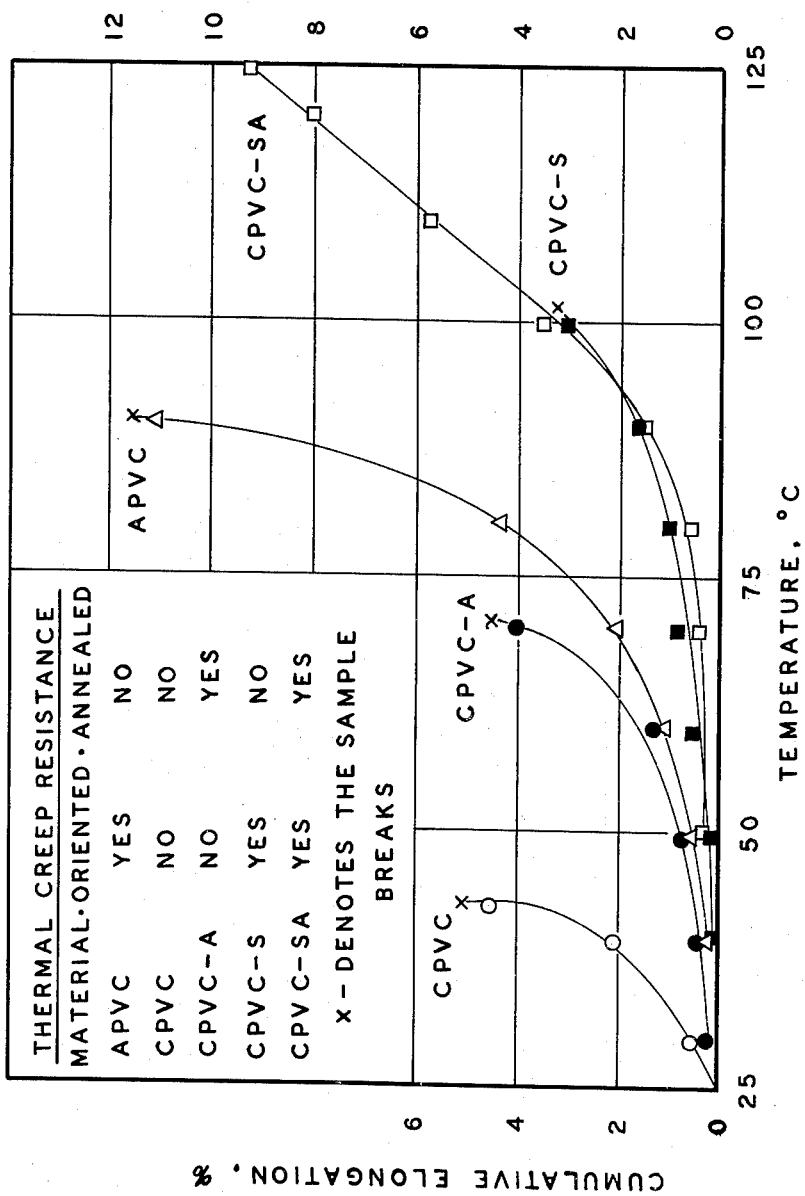

In order to show the thermal dimensional stability or creep-resistance of the crystallizable polyvinyl chloride members produced according to the present invention, under heavy loads, and at cumulating temperatures up to and beyond the glassy transition temperature of the member ($Tg$), the testing procedure and apparatus disclosed by M. T. Watson et al. in Modern Plastics 34, No. 3,169 (1956), are essentially used and followed. In the present case, the temperature gradient is initiated at 25° C. and then raised to 140° C. at a uniform rate of 2° C. per minute. The load used is 3600 p.s.i., which incidentally is larger than is usually used in creep-resistance testing. The data derived from testing is graphically shown in accompanying Fig. 2. The curves shown there represent the behavior of the strip samples under test, more specifically: (a) CPVC represents the behavior of strip samples taken from the film material of Example IIIA (crystallizable) which are neither stretch-oriented nor annealed, (b) CPVC–A represents the behavior of strip samples which are identical with the strip samples of (a) but which, in addition, are annealed at 170° C. for 15 minutes under full tension (c), APVC represents the behavior of strip samples of the film material of Example IV (atactic) which are stretch-oriented at 30,000% per minute and 115° C. to an extension of 550% of the original length (d), CPVC–S represents the behavior of strip samples taken from the film material of Example IIIA which are stretch-oriented in the manner of (c) above, but which are not annealed, and (e) CPVC–SA which represents the behavior of strip samples which are the same as the strip samples of (d) above but which in addition, have been annealed at 170° C. for 15 minutes under tension. As may be noted in Fig. 2, curve CPVC–SA, representing the polyvinyl chloride members of the present invention indicates on the part of these members higher resistance to tensile deformation at higher temperatures by comparison with the remaining members tested. This type of tensile testing, by producing cumulative elongation in the strip samples, over an extended period of time and under heavy load, indicates that the polyvinyl chloride members of the present invention can be subjected to thermal processing such as dyeing, laundering, ironing, etc. at temperatures to which the remaining members simultaneously tested could not be without suffering severe nonrecoverable deformation.

The present invention is directed to a process for providing uniaxially stretched polyvinyl chloride members which have tensile strengths of up to or greater than about 50,000 p.s.i. and which are essentially shrink-resistant when submerged in water having a temperature of about 100° C. The featured process comprises the steps of subjecting crystallizable polyvinyl chloride members containing a finite quantity of up to 20% by weight of solvent for said polyvinyl chloride and which members have been deposited from a solution to (a) stretching 500–700% of the original length at a rate of 10,000–30,000% per minute of the original length and at a temperature of 100–125° C., and thereafter (b) while maintaining said polyvinyl chloride members in said stretched condition, (c) subjecting the same to a temperature of 150–180° C. for a finite period up to 30 minutes.

CRYSTALLIZABLE POLYVINYL CHLORIDE DEFINED

*Theory.*—When a polymer molecule contains side groups, such as chlorine, and distinguishing simple hydrogen, there are several possible positions which these side groups can assume with respect to one another on the backbone chain. Three of the molecular configurations resulting from this type of positioning can be described, graphically represented and denominated with respect to polyvinyl chloride as follows:

(1) When the side groups are randomly distributed on either side of the backbone chain of the molecule, this isomeric form of polyvinyl chloride is referred to as atactic:

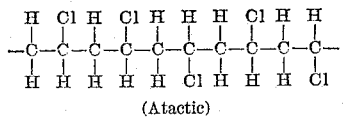
(Atactic)

Conventional type polymerizations of vinyl chloride illustrated by Example IV produce a polymer product which is made up predominantly of the atactic isomeric form. Atactic polyvinyl chloride or those products which are predominantly so, are normally noncrystallizable in nature.

(2) With all the side groups on the same side of the backbone chain, the isomeric form of polyvinyl chloride is referred to as isotactic, e.g.:

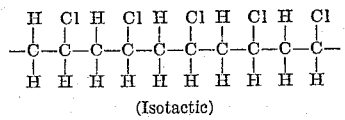
(Isotactic)

(3) If the side groups alternate regularly from one side of the backbone chain to the other side, the isomeric form of polyvinyl chloride is referred to as syndiotactic:

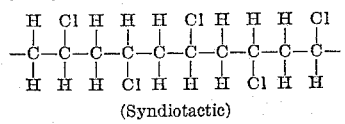
(Syndiotactic)

Both the isotactic and syndiotactic isomeric forms of polyvinyl chloride can be considered as crystallizable forms of polyvinyl chloride. In doing so, however, it should be recognized that few, if any, polyvinyl chloride molecules, which incidentally can contain as many as 2400 or more monomer

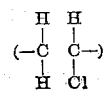

units, are perfectly isotactic or syndiotactic. Rather, they are most generally predominantly one or the other. In the present case then, it is theorized that the polyvinyl chloride which can be successfully oriented and which is referred to as crystallizable polyvinyl chloride is predominantly syndiotactic in configuration with the number of atactic or isotactic interruptions in the syndiotactic configuration being few.

*Practice A.*—The polyvinyl chloride materials which perform satisfactorily in the orientation procedures described herein and which then are described as crystallizable, can be defined in terms of their dynamic elastic moduli measured in the following manner.

Samples of polyvinyl chloride polymer are compression molded at 190–200° C. and press cooled. Within twenty-four hours of being molded, the samples can be tested in a recording torsion pendulum of the type, and in the manner suggested by L. E. Neilsen in Rev. Sci. Instruments 22,690–93 (1951). The temperature at which the samples are tested is 120° C. When so tested, polyvinyl chloride materials having a shear modulus of greater than $5 \times 10^7$ dynes/cm.$^2$, and preferably greater than $9 \times 10^7$ dynes/cm.$^2$ are considered to be crystallizable polyvinyl chloride and suitable for use in practice of this invention.

To illustrate the above, dried portions of the polymer products of Examples I and IV are compression molded at 195° C. and 1,000 p.s.i. molding pressure into test bars having dimensions of 3 x 0.4 x 0.1 inch. The bars are allowed to cool to room temperature in the press and are then removed from the same. The bars are transferred to the recording torsion pendulum where they are tested in accordance with the procedure indicated above, using a chamber temperature of $120 \pm 0.1°$ C. The periods of pendulum oscillation for each of the test bars are taken from the recorder and shear modulus $G_A$ in dynes/cm.$^2$ is calculated using the formula:

$$G_A = \frac{38.54 LI}{CD^3 u} \cdot \frac{1}{p^2}$$

where:
$I$ = moment of inertia in grams $\times$ cm.$^2$ ($I$ = 4310 for disk used).
$L$ = length of test bars between clamps in inches.
$C$ = width of specimen in inches.
$D$ = thickness of specimen in inches.
$u$ = shape factor involving $C/D$ = 4.5 for present test bars.
$P$ = period of pendulum oscillation.

The results calculated are as follows:

*Table IV*

| Material | Shear Modulus ($G_A$) in dynes/cm.$^2$ at 120° C. |
|---|---|
| Example I (crystallizable) | $1.16 \times 10^8$ |
| Example IV (atactic) | $3.00 \times 10^7$ |

*Practice B.*—The X-ray analysis procedures referred to earlier in the exemplary materials, which can be used for identifying crystallizable polyvinyl chloride useful for present purposes is the Monochromatic-Pinhole Technique in Forward-Reflection Method described in X-ray Diffraction Procedures for Polycrystalline and Amorphous Materials by Harold P. Klug and Leroy E. Alexander, published by John Wiley & Sons, Inc., copyright 1954, at pages 218–221.

A sample of the polyvinyl chloride to be tested is dissolved in cyclohexanone at 120° C. to provide a 3% by weight solution of the same. The solution is poured onto sheets of glass and dried in a circulating-air oven at 50–70° C. for 6 hours. The assembly is then air-dried at 120° C. under 1.0 mm./Hg for a period of 10 hours, i.e., to constant weight. The cast sheet is pulled off the glass plates, then cut and stacked to a thickness of about 0.12 cm. The stack sample is mounted in a jig which is placed normal to a collimated X-ray beam generated by North American-Phillips X-ray generator, Model No. 12045. The photographic film (Kodak "No-Screen" Medical) is located normal to the said beam 3.42 cm. from the sample. To facilitate multi-exposures of the film, all but one quadrant of the film are masked.

Nickel-filtered radiation from a copper X-ray target operated at 35 kv. and 20 ma. is directed into the collimator for 120 minutes. The exposed film is then developed for 5 minutes in Eastman-Kodak liquid X-ray developer at 20° C., and is then fixed, washed, and dried.

The resulting photograph is photometered in a Joyce and Loebl recording microdensitometer Mark III.

As noted above, portions of the film can be masked in order that the X-ray image of the test sample will be registered on one quadrant only of the film. Thereafter another or other quadrants can be separately exposed in order that the X-ray image of standard polyvinyl chloride, to wit: constituting commercial polyvinyl chloride, can be registered on the same film, but in a different quadrant.

The microdensitometer recordings are plots of the optical density (O.D.) of the photographic film vs. linear distances in the film, the latter commonly expressed as tan $2\theta$ and obtained by dividing the distance on the film from its center by the distance of the mounted stacked sample from the photographic film (3.42 cm. in the present instance). To express it trigonometrically $$\tan 2\theta = \frac{r}{R}$$

where
$r$=distance in film from center of same, and
$R$=distance of sample to film (3.42 cm.)

After correcting the recordings for background and air scatter, the optical density (O.D.) of the diffraction peaks at 17.2° $2\theta$ and/or at 24.2° $2\theta$ is measured. If the test sample evidences an optical density at either or both of the above angular locations which is 105% or more of the optical density of the atactic standard sample, the polyvinyl chloride from which the test sample is originally cast can be considered crystallizable for present purposes.

PREPARATION OF CRYSTALLIZABLE POLYVINYL CHLORIDE

Polyvinyl chloride which is crystallizable for present purposes can be produced in a polymerization process operated at relatively low temperatures; about —20 to —60° C., when mass polymerization procedures are followed, and about —20 to —40° C. when either solvent or suspension-type polymerization processes are practiced. For best results, free-radical type catalysts are prescribed. These are exemplified by multi-component catalysts, such as are had in combining a trialkyl borane and an oxygen donating material and more specifically, by combining tri-n-butyl borane and hydrogen peroxide, tri-ethyl borane and air, etc. The amount of this type of catalyst to be used is preferably on the order of 0.1 mol percent based on the monomer, with the borane and oxygen-donating components being in approximately equal molar amounts. When multi-component catalysts of this type are used, it bears cautioning that the components should be kept apart prior to contacting the monomer.

Polymerization is preferably carried on until the polymer product has a molecular weight of 60,000–150,000 inferred from the viscosity as determined on a cyclohexanone solution of the product in the Ostwald-Fenske viscometer.

During production of crystallizable polyvinyl chloride, generally a quantity of polyvinyl chloride is co-produced which is less readily crystallized and for present purposes noncrystallizable due to more frequent interruptions of the regular syndiotactic arrangement of the assymetric carbons. This noncrystallizable type or fraction is also that referred to here as atactic polyvinyl chloride. The atactic fraction can be extracted with tetrahydrofuran or various other solvents such as dimethyl formamide, cyclohexanone, etc. When this extraction procedure is carried on, generally the weight of solvent is preferably 50 times that of the polymer and the temperature is maintained at 20° C. to 30° C. A period of about 12 hours or more is generally required for satisfactory solvation of the atactic polyvinyl chloride. After decanting the solvent containing the atactic polyvinyl chloride, the crystallizable polyvinyl chloride, which remains in gel form can be treated in any conventional manner prior to being resolvated and cast.

While homopolymers of crystallizable polyvinyl chlorides are primarily intended, it is also possible to use interpolymers of crystallizable polyvinyl chloride such as are had by interpolymerizing with vinyl acetate and vinyl esters, acrylates, methacrylates and maleic and fumaric esters under the conditions previously described. These interpolymers should contain greater than about 75% by weight of crystallizable polyvinyl chloride.

CASTING CRYSTALLIZABLE POLYVINYL CHLORIDE MEMBERS

Polyvinyl chloride members capable of being stretch-oriented and annealed in the prescribed manner can be cast from 2–10% solutions of the crystallizable polymer in solvent. Solvents which can be used for casting are cyclohexanone, dimethyl formamide, acetamide or mixtures of the preceding with lower boiling solvents such as dioxane, tetrahydrofuran etc. Ideally, the solvents should be capable of being heated to 125° C. to 150° C. with minimum evaporation, to facilitate practice of the casting operation at these preferred temperatures. In the casting operation, the hot casting solutions can be poured onto a surface maintained at room temperature and dried to films, ribbons, etc. or the casting solution can be wet or dry spun directly into fibers, filaments, etc., and dried.

The films, fibers, filaments, etc. can be dried in a manner designed to allow the prescribed amount of solvent to remain in them. In this regard, the term "solvent" is intended to include swelling agents as well as true solvents for the crystallizable polyvinyl chloride. Alternatively, the films, fibers, etc. can be dried essentially to completeness and the solvent or swelling agent added later to provide a quantity of solvent ranging from a finite amount up to about 20% by weight of the members. In this regard, 1–8% by weight of solvent is preferred with 2–4% by weight of solvent giving optimum performance. Solvents and swelling agents which can be utilized for this purpose include those mentioned above as casting or spinning solvents as well as methyl isobutyl ketone, toluene, dibutyl ether, methyl propyl ketone, xylene, dibutyl phthalate, etc.

STRETCH-ORIENTATION OF CRYSTALLIZEABLE POLYVINYL CHLORIDE

The crystallizable polyvinyl chloride members, films, fibers, filaments, etc. which contain the indicated amount of solvent or swelling agent can be uniaxially stretched at a rate of 10,000–30,000 percent/minute and more preferably 15,000–2,000 percent/minute under temperature condition of 100–125° C. and more preferably 115–120° C. The extent of uniaxially stretching is 500–700% of the original length and more preferably approaching 700%.

The stretch-orienting conditions are essentially interdependent variables. To illustrate, where the greater extensions of stretching are desired, the lower rates of stretching under the higher stretching temperatures, each of course within the ranges disclosed, are used. Where the lesser stretch extensions are desired, however, the entire ranges of stretching rates and temperatures can be utilized.

A further caution involves stretching temperature. The range, indicated for this, that is 100–125° C., lies about 10–20° C. above the second order transition temperature or glassy transition temperature, $T_g$, for the crystallizable polyvinyl chloride which is used here. At lesser temperatures, those lying immediately about $T_g$, the type of stretching which results is the cold or localized type, whereas that type of stretching presently desired is that which is homogeneous, or in which elongation occurs simultaneously over the entire length of the member being stretched.

For crystallizable polyvinyl chloride which is essentially pure, that is free of solvents, swelling agents or other foreign materials, $T_g$ lies about 100–105° C. This, however, becomes lowered, to as low as 90° C. when solvent in the amounts presently prescribed are present. This then, accounts for the stretching temperature presently taught. The preferred stretching temperature of 115–120° C. reflects the presence of 2 to 4 weight percent solvent present in the crystallizable polyvinyl chloride.

ANNEALING OF STRETCH-ORIENTED CRYSTALLIZABLE POLYVINYL CHLORIDE

The stretch-oriented crystallizable polyvinyl chloride members are maintained in stretch condition and subjected to an annealing temperature of 150–180° C. and more preferably about 170° C. for a period ranging from the finite up to 30 minutes. A more preferred period for annealing ranges 5–10 minutes.

As in the case of stretching, the annealing temperature is incidentally dependent upon the amount of solvent present in the crystalline polyvinyl chloride. With the higher amounts of solvent then, lower temperatures in the range are used. As to the preferred annealing temperature of about 170° C., this reflects the presence of 2–4 weight percent of solvent, earlier indicated as being preferable.

Annealing can be carried out using liquid baths, gaseous atmospheres, streams, as well as rolls, provided that they are heated sufficiently to provide the members with the indicated annealing temperatures.

While annealing is preferably carried out immediately after the orientation step it can be postponed in time, provided, however, that the members are maintained in a stretched condition until such time as the annealing operation is carried out. During any postponement, if the members are kept at ordinary room temperatures they retain their stretched condition and tension need not be supplied for this purpose. Finally, the members can be allowed to retract prior to or during the annealing operation, provided the final amount or extent of stretch comes within that prescribed above.

EFFECTING THE ORIENTATION AND ANNEALING OPERATIONS

The stretching step can be carried out in a stretching frame supporting a pair of reels positioned in spaced relationship, and interposing a circulating air oven. The oven is maintained at a temperature of 110–125° C. The reels are operated at different speeds, the after reel being operated at relatively higher speed with the differential in speeds being designed to introduce a predetermined amount of stretching, i.e., 500–700%, as determined on the original length of the material. The crystallizable polyvinyl chloride is introduced to the stretching step in the form of fibers, ribbons, etc., individually or as tows of the same. The same function can also be accomplished by substituting for the oven described above, heated rolls, pins, shoes or plates. The overall advance of the reels together with the effective area of the heated atmosphere or number of interposed heated rolls will determine the speed at which stretching is initiated in the crystallizable polyvinyl chloride.

Heat setting can be carried out by advancing the crystallizable polyvinyl chloride on another series of reels or rolls with the desired temperature provided in the manner previously described. These too, can be operated at differential speeds in order to maintain the desired amounts of stretch or tension in the stretch-oriented crystallizable polyvinyl chloride. Temperature for the heat setting step is 160–180° C. to which the crystallizable polyvinyl chloride is subjected for a period of up to 15–30 minutes.

It will thus be seen that the objects set forth above, among those made apparent from the preceding description are efficiently attained, and since certain changes may be made in carrying out the above orientation process and in the resulting polyvinyl chloride products without departing from the scope of the invention, it is intended that all material contained in the above description shall be interpreted as illustrative and not in a limiting sense.

What is claimed is:

1. A process for providing uniaxially stretched polyvinyl chloride members having tensile strengths of greater than about 50,000 p.s.i. and which are essentially shrink-resistant when submerged in water having a temperature of about 100° C., which comprises the steps of subjecting members of crystallizable polyvinyl chloride containing a finite quantity of up to 20% by weight of a solvent for said polyvinyl chloride and which have been deposited from a solution to (a) stretching 500–700% of the original length at a rate of 10,000–30,000% per minute of the original length and at a temperature of 100–125° C., and thereafter (b) while maintaining said polyvinyl chloride members in said stretched condition subjecting the said members to a temperature of 150–180° C. for a finite period of up to 30 minutes.

2. The process according to claim 1 wherein stretching is carried out under a temperature of 115–120° C.

3. The process according to claim 1 wherein the annealing time is 5–10 minutes.

4. The process according to claim 1 wherein the members of polyvinyl chloride contain 1—8% by weight of solvent.

5. The process according to claim 1 wherein the polyvinyl chloride members contain 2–4% by weight of solvent.

6. The process according to claim 1 wherein the solvent in said members is cyclohexanone.

7. Uniaxially stretched polyvinyl chloride members exhibiting the properties of (a) tensile strength up to and greater than 50,000 p.s.i., (b) essential shrink-resistance in water having a temperature of about 100° C. and (c) a static isothermal Young's modulus greater than $1 \times 10^8$ dynes/cm.$^2$ at 160° C.

References Cited in the file of this patent

UNITED STATES PATENTS

| | | |
|---|---|---|
| 2,420,565 | Rugeley et al. | May 13, 1947 |
| 2,578,899 | Pace | Dec. 18, 1951 |

UNITED STATES PATENT OFFICE
CERTIFICATE OF CORRECTION

Patent No. 2,984,593              May 16, 1961

Robert A. Isaksen et al.

It is hereby certified that error appears in the above numbered patent requiring correction and that the said Letters Patent should read as corrected below.

Column 1, line 35, for "temepratures" read -- temperatures --; column 3, line 25, for "grandular" read -- granular --; column 10, line 58, for "CRYSTALLIZEABLE" read -- CRYSTALLIZABLE --; line 65, for "15,000-2,000" read -- 15,000-20,000 --.

Signed and sealed this 21st day of November 1961.

(SEAL)
Attest:

ERNEST W. SWIDER              DAVID L. LADD
Attesting Officer             Commissioner of Patents

USCOMM-DC